US009167937B2

(12) United States Patent
Kent (10) Patent No.: US 9,167,937 B2
(45) Date of Patent: Oct. 27, 2015

(54) TOOL FOR FRYING A TORTILLA WITH A SEMI-PLIABLE CENTER

(71) Applicant: Glen Alan Kent, Fullerton, CA (US)

(72) Inventor: Glen Alan Kent, Fullerton, CA (US)

( * ) Notice: Subject to any disclaimer, the term of this patent is extended or adjusted under 35 U.S.C. 154(b) by 123 days.

(21) Appl. No.: 13/651,404

(22) Filed: Oct. 13, 2012

(65) Prior Publication Data

US 2013/0224363 A1    Aug. 29, 2013

Related U.S. Application Data

(60) Provisional application No. 61/603,952, filed on Feb. 28, 2012.

(51) Int. Cl.
*A47J 37/00* (2006.01)
*A21D 13/00* (2006.01)
*A47J 37/12* (2006.01)

(52) U.S. Cl.
CPC ......... *A47J 37/1295* (2013.01); *A21D 13/0074* (2013.01); *A21D 13/0096* (2013.01)

(58) Field of Classification Search
CPC ............ A47J 37/1295; A21D 13/0074; A21D 13/0096
USPC ........... 99/431, 432, 426, 427, 430, 517, 449, 99/450, 407
See application file for complete search history.

(56) References Cited

U.S. PATENT DOCUMENTS

| 3,075,798 | A | * | 1/1963 | Smith | 294/15 |
| 3,308,748 | A | * | 3/1967 | Jalbert | 99/402 |
| 5,236,727 | A | * | 8/1993 | Huston | 426/138 |
| 5,400,704 | A | * | 3/1995 | Huston | 99/450 |
| 6,244,167 | B1 | * | 6/2001 | Mc Carney | 99/349 |

* cited by examiner

*Primary Examiner* — Dana Ross
*Assistant Examiner* — John J Norton
(74) *Attorney, Agent, or Firm* — George P. White (57) ABSTRACT

A tool and method allow cooking a tortilla in a generally flat state, in a shallow amount of oil. A central strip is held out of the oil and isn't fried. Side strips to the central strip are less fried. This produces a taco shell that is flexible at the bottom, allowing a living hinge, while crispy in its main portions. A raising bar and left and right hold-downs comprise described tools.

5 Claims, 9 Drawing Sheets

TOOL FOR FRYING A TORTILLA WITH A SEMI-PLIABLE CENTER

RELATED APPLICATIONS

This application claims the benefit of U.S. provisional application 61/603,952 titled Taco Shell Frying Device and filed on Feb. 28, 2012, and hereby incorporates that application herein in its entirety.

BACKGROUND

Taco shells are U-shaped fried tortillas to be filled with a variety of foodstuffs and eaten. While they have been made for many, many years there is still no convenient way, outside of a production environment, to take a soft, pliable tortilla and turn it into fried U-shaped hard shell taco. If it is formed in a U before being fried, a tall, narrow very deep container of hot oil might be used. This type of container, including a way to keep its oil uniformly hot, is not a standard household item. If only a shallow layer of hot oil is available, then the U-shaped tortilla would need to be set in the oil twice, once per side.

Alternatively if the tortilla is fried flat then it will become stiff and brittle throughout and not amenable to be bent into a U-shape unless it is manipulated in a complex manner while frying. However it is produced, the result is a U-shaped brittle taco shell that is likely to crack when foodstuffs are added or when the first bite is taken.

SUMMARY

These teachings solve the problem of conveniently transforming a pliable flat tortilla into a selectively fried, U-shaped taco shell in some embodiments, by providing a raising bar that holds a central strip of the tortilla a small distance up out of a pool of hot oil, it is held up in a way that discourages that strip from being fully fried, while other structures hold the remainder of the tortilla down flat in the oil. They particularly hold down linear regions adjacent to the raising bar on both sides of the raising bar.

DETAILED DESCRIPTION

In order to produce a taco shell that is crisp while still being openable and closeable, selective frying is performed. Tools taught here help to accomplish this conveniently even in a shallow pool of oil. Three embodiments are described here and many other implementations are possible. This description covers cooking tools for readily accomplishing this task, methods of their use and the resulting taco shell.

Aspects common among the three embodiments described include: cooking tortillas in a generally flat orientation allowing use of a shallow pool of oil, holding a central strip of the tortilla up out of the oil, and holding the rest of the tortilla down flat in the oil.

First Embodiment Frying Tool

Structure

Figure 1:
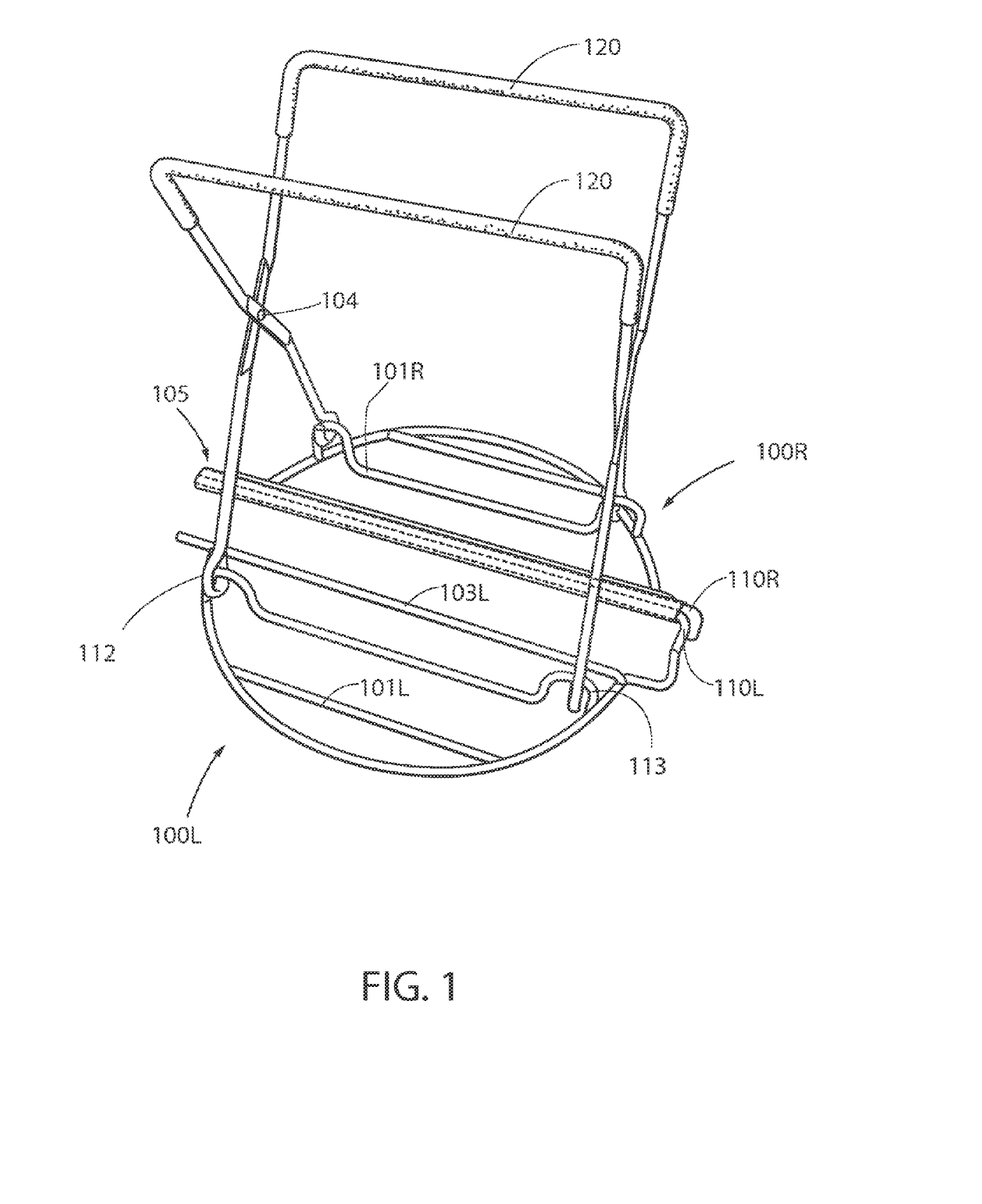
FIG. 1 shows a perspective view of first embodiment of a tortilla fryer.

This embodiment is constructed of wire frame and is composed of two flat sides 100L and 100R that are near mirror images of each other, a raising bar 105 between them and handles 120 for its operation. The left and right sides are called hold-downs. FIG. 1 shows the left hold-down 100L as a rigid wire frame structure that has a planar, half circular region with the flat side of the half circle having an articulated wire arm 110L parallel to the flat side of the hold-down and raised above it. That wire is abutted along its length by the corresponding arm 110R of the mirror image right hold-down. The left and right arms are coupled by a tubular flexible coupling 111 with a figure 8-style profile. The coupling allows for pivoting of each arm in the coupling tube creating the raising bar which also acts as a hinge between the left and right sides. In a variation, the arms are fit tightly into their respective portions of the figure-8 profile such that turning the arms turns the two channels of the figure-8. In this variation, the cover is of a resilient material that allows this turning in opposing directions but then springs the unit back to the position of FIG. 1 when released. Other methods of providing a spring return are all possible.

Figure 2:
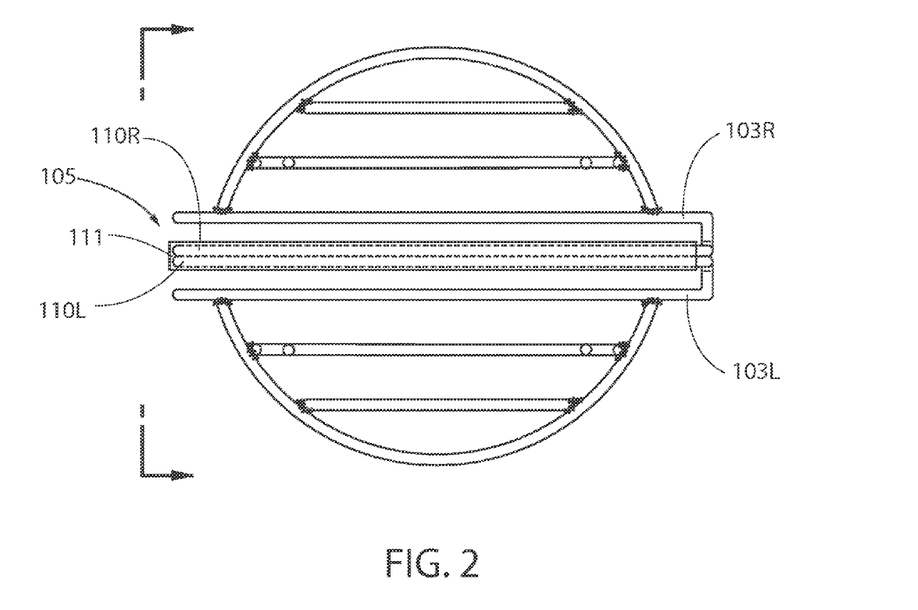
FIG. 2 shows a top view of the apparatus in FIG. 1 without showing handles.
Figure 3:
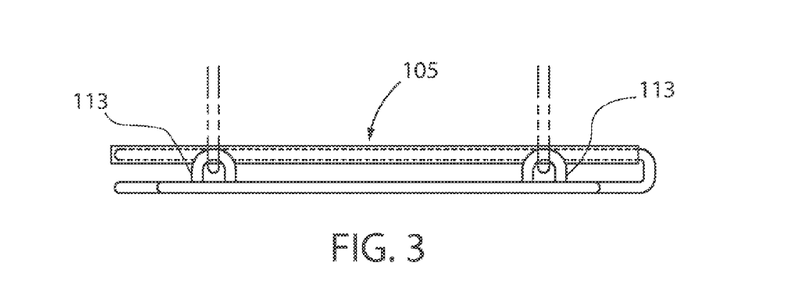
FIG. 3 shows a fragmentary side view of the apparatus in FIG. 1 showing handle attachment.

There is a pair of scissor style handles 120 that hook onto loops 113 on the left and right sides. This allows a user to move the cooking tool into different states. FIG. 2 shows a top view of the unit without the scissor handles. The arms 110R, 110L and the tubular flexible coupling 111 they are inserted into are clearly seen in this view while FIG. 3 shows a side view of the arms above the plane of the hold-downs. Collectively, the arms in the tubular flexible coupler comprise the raising bar 105 of this first embodiment.

Figure 4:
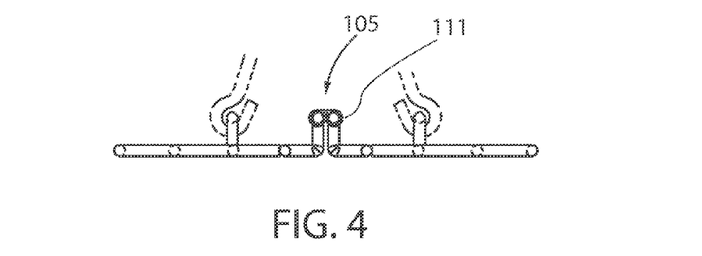
FIG. 4 shows a fragmentary front view of the apparatus in FIG. 1 for showing handle attachment.

In dashed lines, FIG. 4 shows the ends of the scissor handles angled as they attach to the loops 113 on the hold-downs. This angle allows the handles to apply forces to the hold-downs that cause them to be moved upwards into a V.

Operation

Figure 5A:
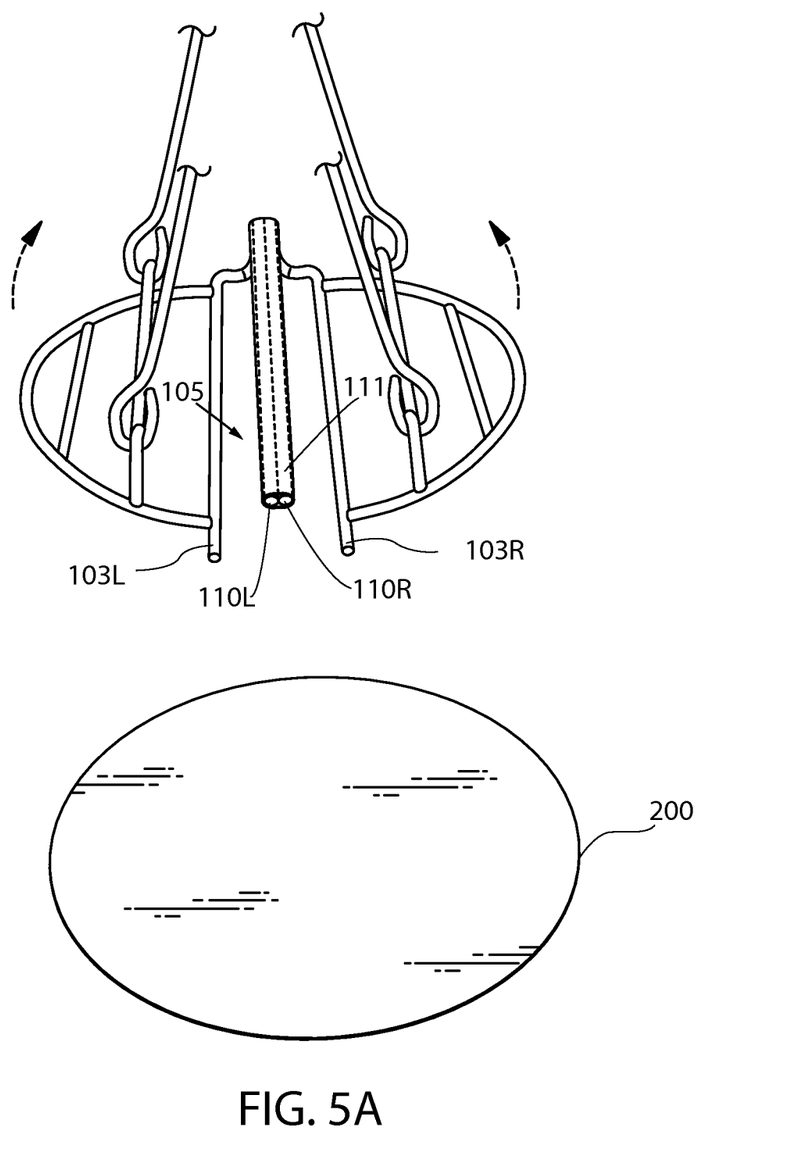
FIG. 5A shows a perspective view of the apparatus being moved to tortilla insertion configuration.
Figure 5B:
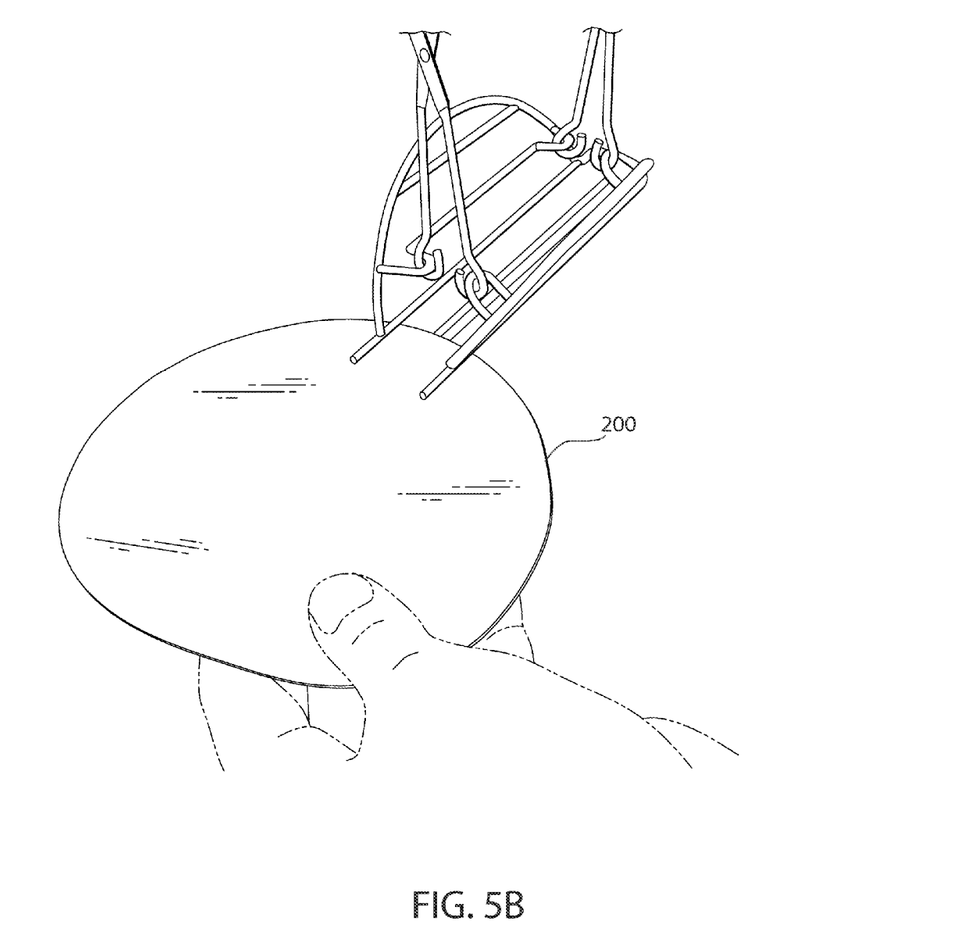
FIG. 5B shows a perspective view of the apparatus in tortilla insertion configuration with a tortilla being inserted.
Figure 6:
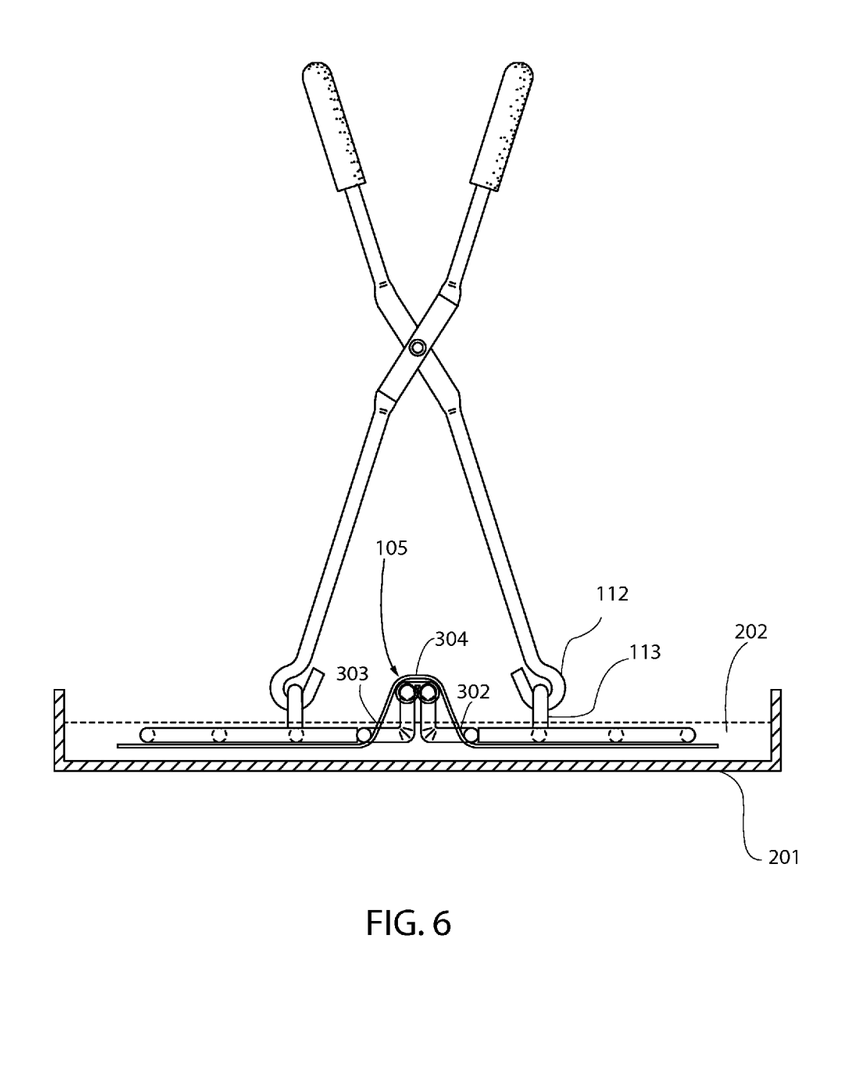
FIG. 6 shows a front sectional view of the tortilla being fried.

In order to fry a tortilla the tool is opened to a state that allows the tortilla to be inserted. FIG. 5A shows the unit being brought into a V. This motion lowers the raising bar 105 below the upward moving hold-downs 105 L 105 R. When that position is reached a tortilla 200 can be slid in above the raising bar but below the hold-downs as seen in FIG. 5B. After inserting the tortilla, the system is placed down in the pan submerging the raising bar 105 and tortilla under the oil. Then the scissor handles 120 are released. This action captures the inserted tortilla between the raising bar and the hold-downs in a way that brings a central strip of the tortilla above the rest of the tortilla. FIG. 6 portrays the tool and tortilla placed in the pan, where most of the tortilla is under the oil being cooked. A central-most strip 304 is held out of the oil and doesn't fry. Regions on either side of the central-most strip 302 303 are also out of the oil but do get fried to some extent since they are close to the oil and some wicking occurs.

Figure 7:
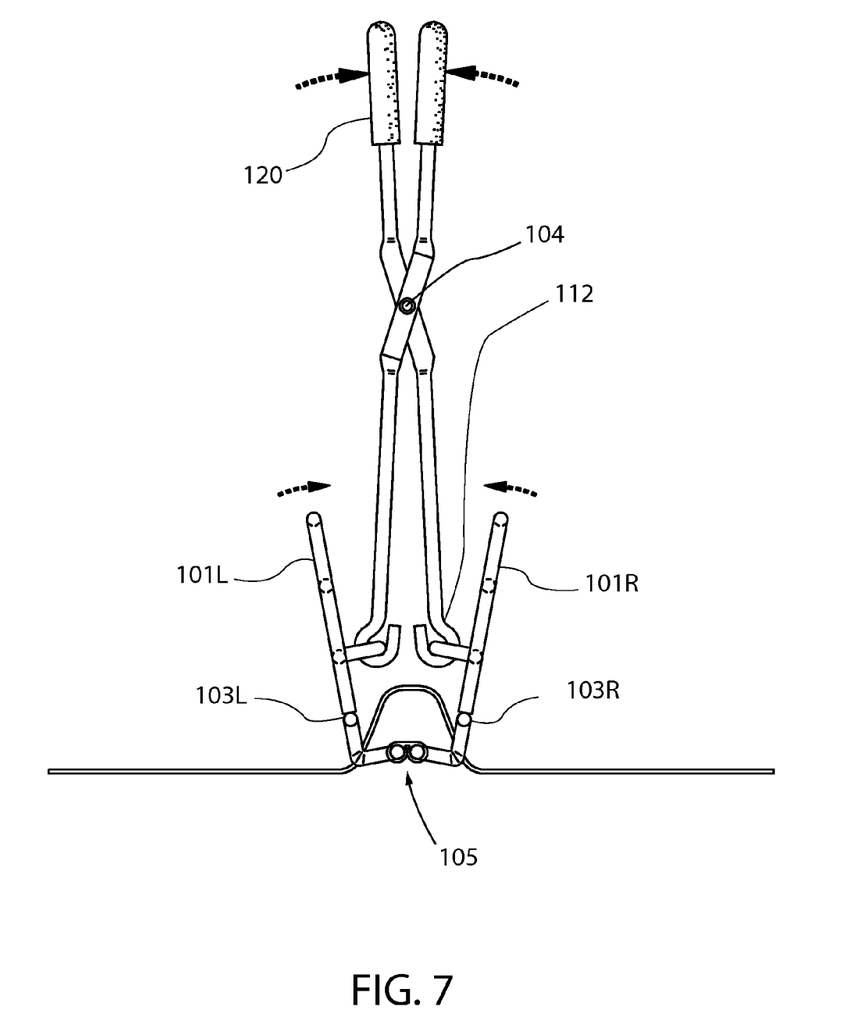
FIG. 7 shows a front view of fryer of the apparatus in FIG. 1 being moved to release a taco configuration.
Figures 8A, 8B, 9:
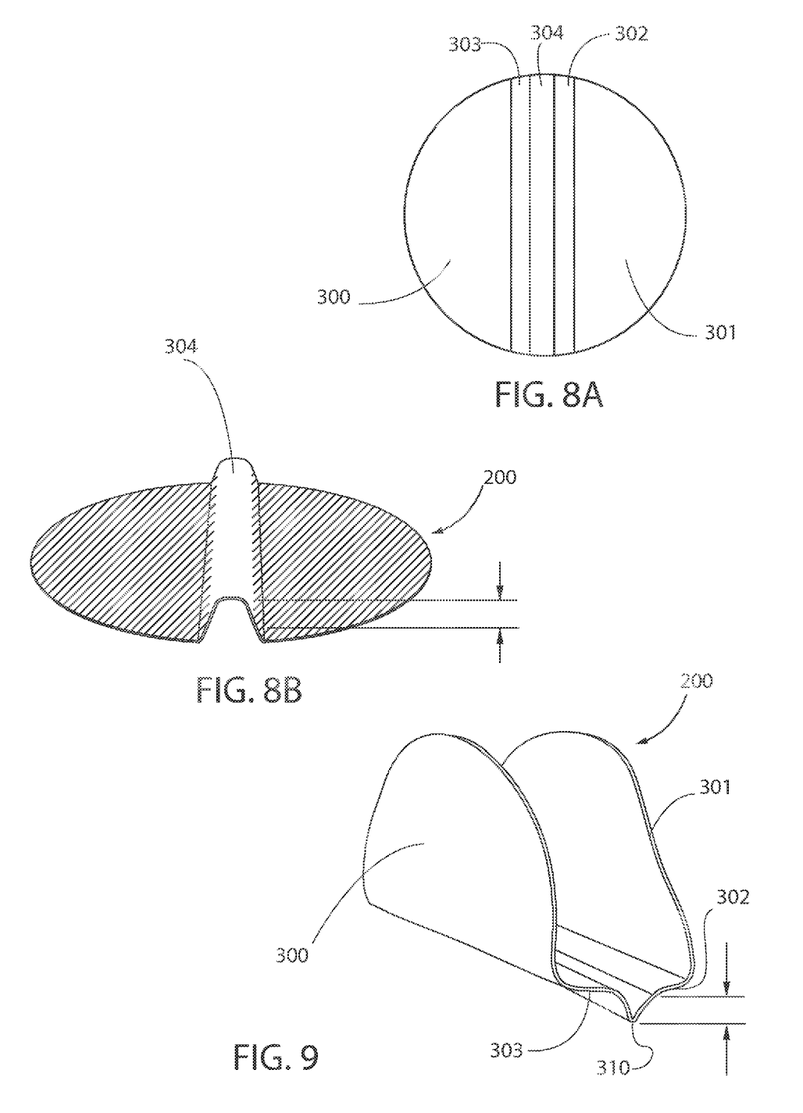
FIG. 8A shows a flattened view of the tortilla after being fried.
FIG. 8B shows a taco immediately after being fried.
FIG. 9 shows the fried taco in configuration for use.

When fried, the tool and tortilla are removed from the oil and the scissor handles are pulled together again as in FIG. 7. This allows the release of the fried tortilla. FIG. 8A shows the fried tortilla flat on a table in a schematic view. The left 300 and right 301 portions are fully fried, the most central strip 304 is un-fried and the side strips 303 302 are partially fried but still pliable and not brittle.

FIG. 8B shows the tortilla after being fried. For usage, the left 300 and right 301 portions are lifted up generally parallel to each other as seen in FIG. 9. That figure shows the taco ready to fill with foodstuffs. The V-shaped lowermost tip 310 is created by the un-fried central strip 304 being formed when the sides are folded into the taco shape. The two portions on either side which are parallel to the earth are the partially fried strips 302 303. With the pliability of those three regions, the crisp sides of the taco shell can be opened and closed with no danger of brittle cracking. The regions between the central strip and the crisp sides act as living hinges.

Second Embodiment Frying Tool

Structure and Operation

Figures 10, 11, 12:
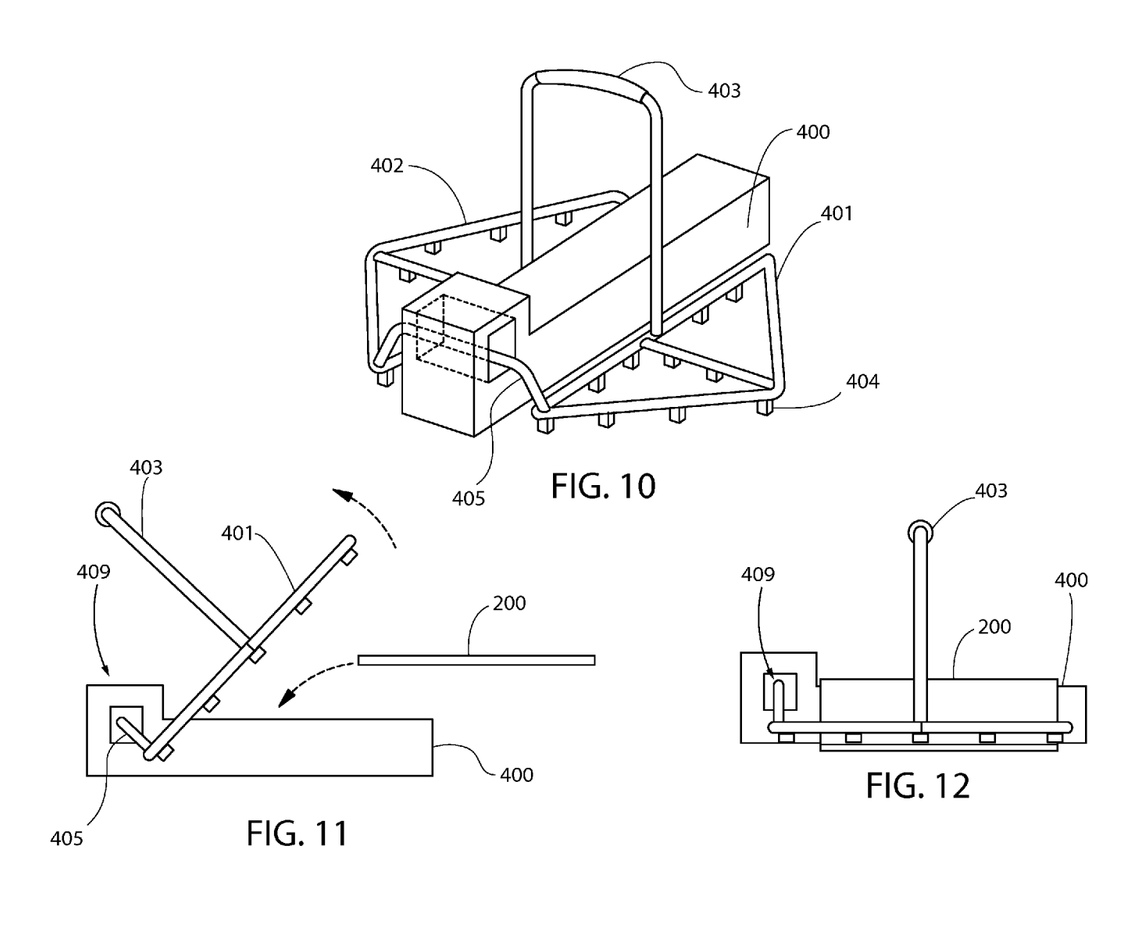
FIG. 10 shows a perspective view of the second embodiment tortilla fryer.
FIG. 11 shows a side view of the second embodiment tortilla fryer in open mode for accepting tortilla.
FIG. 12 shows a side view of the second embodiment tortilla fryer in closed, frying mode.

This version has triangular left 402 and right 401 hold-downs that are integrated as single ridged structure with handle 403. As seen in FIG. 10 the raising bar 400 is a solid elongated structure that remains in place flat on the supporting surface. The bar has an aperture 409 that a bridge 405 between the left and right hold-down sides passes through. In an open state, seen in FIG. 11, a tortilla 200 can be set down on the raising bar. Then the hold-downs are lowered as in FIG. 12 and the tortilla can be fried with the central-most strip held out of the oil by the raising bar.

Note that the hold-downs are comprised by a wire frame with numerous feet 404. The feet are the parts that actually contact the tortilla in this embodiment.

Third Embodiment Frying Tool

Structure and Operation

Figure 13:
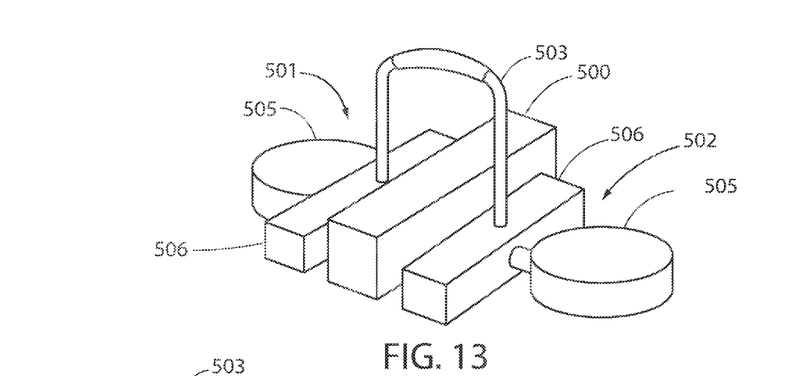
FIG. 13 is a perspective view of the third embodiment tortilla fryer.
Figure 14:
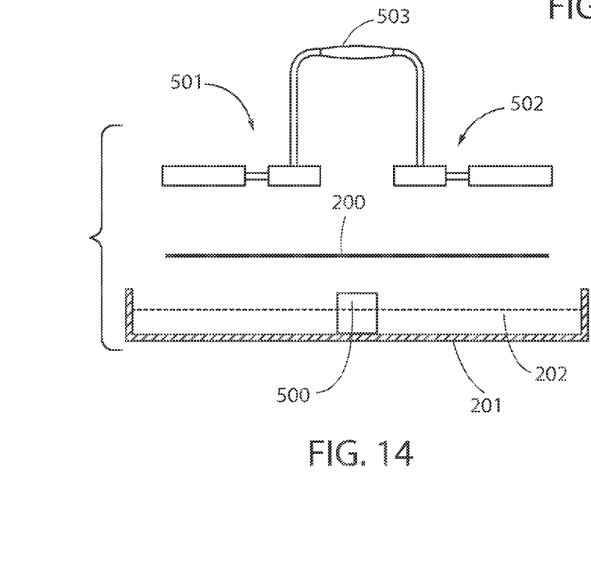
FIG. 14 shows a front view of the third embodiment open to accept tortilla.
Figure 15:
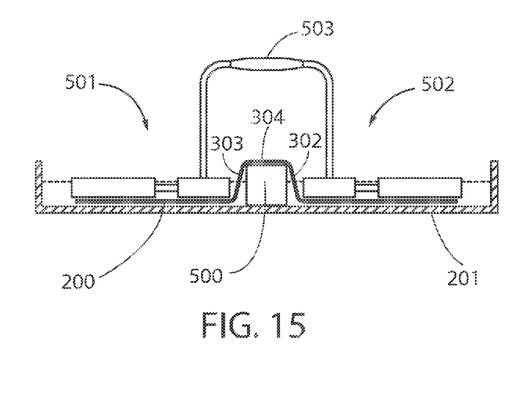
FIG. 15 shows a front view of the third embodiment in closed frying mode.

In this third embodiment, seen in FIG. 13 there is no mechanical connection between the raising bar 500 and the hold-downs. The raising bar is a simple elongated bar and the left 501 and right 502 hold-downs are connected by a U-shaped handle 503. Each hold-down has two interconnected portions. One is circular shaped 505 and has the role of holding down its respective half of the tortilla. The second portion is linear 506 and is along the edge of the region to be held down. As in the other two embodiments, the linear portion of the hold down is adjacent to the raising bar on either side of it. This structure produces the U-shape of tortilla being held out of the oil.

It is claimed:

1. A frying accessory comprising:
   a. a left and a right opposing hold-down flap each having a respective lowermost rigid structure defining a plane, the lowermost rigid structures of a size and configuration as to hold a tortilla flat against a horizontal surface;
   b. an elongated, generally straight, central lift bar moveably coupled between the left and right hold-down flaps;
   the coupling of the hold-down flaps and the central lift bar providing for at least two configurations of relative positioning:
   a first frying configuration in which the left hold-down flap's lowermost region and right hold-down flap's lowermost region are co-planar and mutually proximate with a gap between them, the gap being generally rectangular and through the accessory;
   further, in the frying configuration, the central lift bar being parallel to and directly above the gap and in a plane parallel to the hold-down flaps' planes; and
   a second inserting-removing configuration in which both the left and right hold-down flaps are above the central lift bar.

2. The frying accessory of claim 1 where the left and right hold-down flaps are symmetric.

3. The frying accessory of claim 1 where the left and right hold-down flaps are comprised of wire rods.

4. The frying accessory of claim 1 where the central lift bar is comprised of a pair of straight bars including a left bar and a right bar, the straight bars having a mutual, tubular cover of a resilient material comprising their mutual coupling; further, the left lift bar coupled to the left hold-down flap and the right lift bar coupled to the right hold-down flap; the pair of bars and their cover comprising a hinge between the left and right hold-down flaps.

5. The frying accessory of claim 4 where the central lift bar is so configured that the resiliency of the mutual, tubular cover acts as a return spring, engendering the accessory to move from the frying configuration to the insert-remove configuration.

* * * * *